Aug. 24, 1948.   R. J. S. PIGOTT ET AL   2,447,595
SAMPLER FOR GAS-LIQUID MIXTURES
Filed April 16, 1945
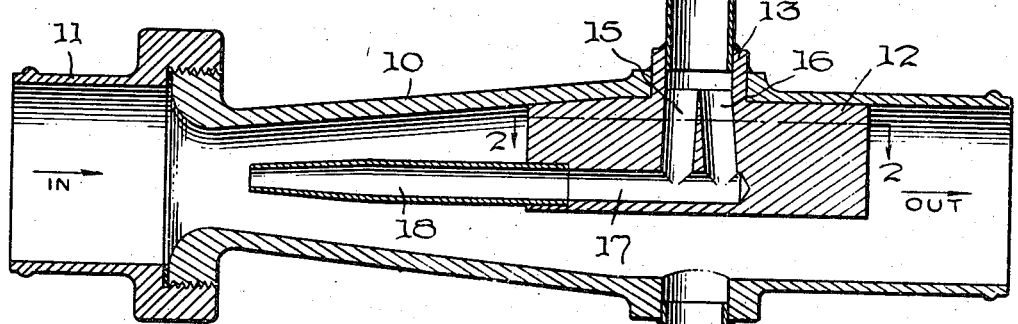
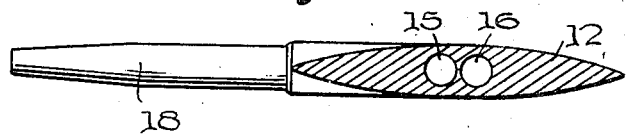
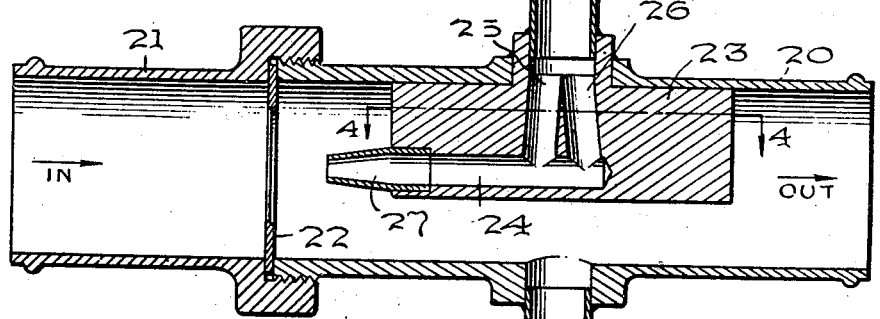
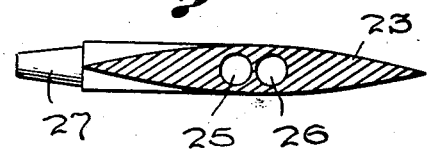
Inventors
R. J. S. PIGOTT
CHARLES R. TAYLOR
By
G. M. Houghton
their Attorney Patented Aug. 24, 1948

2,447,595

UNITED STATES PATENT OFFICE 2,447,595

SAMPLER FOR GAS-LIQUID MIXTURES

Reginald J. S. Pigott and Charles R. Taylor, Pittsburgh, Pa., assignors to Gulf Research & Development Company, Pittsburgh, Pa., a corporation of Delaware Application April 16, 1945, Serial No. 588,624

1 Claim. (Cl. 73—422)

This invention relates to samplers for gas-liquid mixtures which tap off a portion of a flowing stream, with the entrained gas homogeneously distributed therein, but without substantially raising the resistance to flow of the main stream.

The forced movement of liquid through a filled pipe is resisted at the wall of the pipe and as a result there occurs a laminar flow which may be visualized as a sliding telescopic movement, with the core of liquid moving faster than the surrounding, outer layers. Where bubbles of air or other gaseous fluid are entrained in the liquid, they tend to gather in layers in the stream. This striation of the gas makes it difficult to obtain samples which accurately reflect the gas-liquid ratio of the mixture.

Various attempts which have been made to overcome the difficulty contemplate the use of baffles or other obstructions which create a turbulence in the stream to cause mixing at or immediately upstream of the point where samples are abstracted. These all have the disadvantage that they cause a pressure loss in the system.

The sampler of the present invention permits withdrawal of homogeneous and correct specimens of gas-liquid mixtures by providing a venturi or an orifice for raising the Reynolds number of the stream and thereby producing the desired turbulence for thorough mixing, accompanied by relatively high recovery of the velocity pressure required to produce the higher velocity at the venturi or orifice, as the velocity beyond the sampler is reduced to that normal in the system. Overall pressure drop is thereby minimized. This is an important advantage in the many uses to which the invention may be supplied, as for example in determining the percentage of entrained air in air-oil mixtures existing in aircraft engine lubrication systems during flight. At high altitudes the expansion of entrained air may result in foaming and insufficient delivery of oil to the engine bearings. The relative amounts of air in the oil should therefore be ascertainable during flight for if the amount becomes excessive, destruction of the engine will rapidly follow. In conditioning the mixture for sampling, however, it is important to impose the least possible pressure loss in the lubricating system, since any increase in pressure loss from the oil supply tank to the lubricating pump reduces the flight ceiling of the airplane.

One of the principal objects achieved by our invention is to provide a sampler for a flowing stream of a gas-liquid mixture which causes desired turbulence to break up striations of bubbles in the stream at the point of sampling, while minimizing pressure drop across the sampler.

Another object of the invention is to provide a sampler which imposes the least resistance to the flowing mixture and in which the sampling tube is of an area such as to withdraw a sample of the mixture at the point of greatest mixing and at substantially the same velocity as that of the mixture at such point.

A further object of the invention is to provide a sampler which functions to raise the Reynolds number of a flowing stream of gas-liquid mixture and to extract samples at the point of highest Reynolds number.

Other and further objects and advantages of the invention will be apparent from the following description and drawings, in which Figure 1 is a longitudinal sectional view through one form of sampler.

Figure 2 is a view partly in plan and partly in section along the line 2—2 of Figure 1, of the sampling tube assembly.

Figure 3 is a longitudinal sectional view of a modified form of sampler, embodying an orifice instead of a venturi.

Figure 4 is a view partly in plan and partly in section along the line 4—4 of Figure 3.

Referring more particularly to the drawings, and first to Figure 1, a venturi 10 which is coupled to pipe 11 has a faired block mounted within it, the block being formed with a boss 13 which projects through the well of the venturi at a point rearwardly of its throat, and an internal bore into which pipe 14 is fitted. Two smaller downwardly diverging passageways 15 and 16 in the block 12 connect with a longitudinal passageway 17 which extends along the axis of the venturi and connects with a forwardly projecting sampling tube 18, the tapered end of which lies at the point where the stream of mixture flowing through the venturi is substantially at its point of greatest turbulence. It is essential that the sampling tube not only be accurately located but that it be so sized relative to the throat opening of the venturi that the flow of fluids entering the sampling tube is at substantially the same speed as that in the vena contracta of the main stream. Otherwise, if the tube abstracts the sample at a velocity differing materially from that of the main body of the stream, the sample will be incorrect. The same conditions are required for the modified sampler shown in Figure 3. In this form, a section of pipe 20 which is of the same internal diameter as the connected piping 21 has a disc 22 clamped at its joint on the upstream side and this disc is formed with a circular sharp-edged orifice which produces a vena contracta in the stream at a location about 0.4 to 0.5 of the main pipe diameter from the edge of the orifice. In this construction, as in that previously described, the faired block 23 has internal passages 24, 25 and 26 leading from a sampling tube 27 to an outlet pipe 28 which in turn discharges into a displacement chamber or other analytical apparatus (not shown). Where installation space is a factor which must be taken into consideration the orifice type sampler offers the advantage that it is more compact. It requires a shorter sampling tube and consequently is of less overall length than the Venturi type sampler as is apparent from a comparison of Figures 1 and 3. Here again, however, the sampling tube opens axially of the stream and in the vena contracta where the flow exceeds critical velocity and striation of gas bubbles is broken up.

It is to be noted that while the foregoing description pertains primarily to the application of the subject devices to airplane lubrication systems, they could as well be applied to any lubrication system or to any source of gas-liquid mixture where it may be desirable to know the percentage of gas entrained in the liquid.

What we claim is:

Apparatus for obtaining homogeneous samples of gas-liquid mixtures in flow through a conduit without substantial pressure loss in the conduit therebeyond, comprising an orifice plate for forming a vena contracta in the flowing stream and thereby raising its Reynolds number, a sampling tube having an opening of such dimensions as to make possible sampling at a velocity approaching the velocity of the main stream, said sampling tube extending centrally of the stream into the vena contracta thereof at a point downstream of the orifice approximately one-half the diameter of said conduit, for abstracting samples of the mixture in the same direction and at substantially the same speed as the rate of the main flow at such point of highest turbulence.

REGINALD J. S. PIGOTT.
CHARLES R. TAYLOR.

REFERENCES CITED

The following references are of record in the file of this patent:

UNITED STATES PATENTS

| Number | Name | Date |
| --- | --- | --- |
| 790,888 | Ferris | May 30, 1905 |
| 1,041,470 | Hiller | Oct. 15, 1912 |
| 2,020,529 | Thorsten | Nov. 12, 1935 |
| 2,322,018 | Huber | June 15, 1943 |
| 2,327,111 | Kimmell | Aug. 17, 1943 |
| 2,363,625 | Swearingen | Nov. 28, 1944 |
| 2,380,977 | Lewis | Aug. 7, 1945 |